United States Patent
Thomason et al.

(10) Patent No.: US 10,620,673 B2
(45) Date of Patent: *Apr. 14, 2020

(54) PORTABLE COMPUTER ELECTRICAL GROUNDING AND AUDIO SYSTEM ARCHITECTURES

(71) Applicant: Apple Inc., Cupertino, CA (US)

(72) Inventors: Gary Thomason, Boulder Creek, CA (US); Kevin S. Fetterman, Los Altos, CA (US); Laura M. DeForest, Sunnyvale, CA (US); Ron Hopkinson, Campbell, CA (US); Michelle Goldberg, Sunnyvale, CA (US); Ruchi Goel, San Jose, CA (US); John Raff, Menlo Park, CA (US); Timothy S. Hibbard, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 153 days.

This patent is subject to a terminal disclaimer.

(21) Appl. No.: 15/802,339

(22) Filed: Nov. 2, 2017

(65) Prior Publication Data

US 2018/0067523 A1 Mar. 8, 2018

Related U.S. Application Data

(60) Division of application No. 13/973,467, filed on Aug. 22, 2013, now Pat. No. 9,829,930, which is a
(Continued)

(51) Int. Cl.
*G06F 3/16* (2006.01)
*G06F 1/16* (2006.01)

(52) U.S. Cl.
CPC .......... *G06F 1/1688* (2013.01); *G06F 1/1616* (2013.01); *G06F 1/1656* (2013.01); *G06F 1/1662* (2013.01); *G06F 3/16* (2013.01)

(58) Field of Classification Search
CPC .... G06F 1/1616; G06F 1/1656; G06F 1/1662; G06F 1/1688; G06F 3/16
(Continued)

(56) References Cited

U.S. PATENT DOCUMENTS 2,964,887 A 12/1960 Orozco
3,517,466 A 6/1970 Bouvier
(Continued)

FOREIGN PATENT DOCUMENTS

EP 0683026 3/2001
EP 0911717 3/2003
(Continued)

OTHER PUBLICATIONS

Clayton R. Paul, Electromagnetic Compatibility, 2006, Second Edition, John Wiley & Sons,pp. 788, 796-802, 810-812 (Year: 2006).*

(Continued)

*Primary Examiner* — Vivian C Chin
*Assistant Examiner* — Friedrich Fahnert
(74) *Attorney, Agent, or Firm* — Kilpatrick Townsend & Stockton LLP

(57) ABSTRACT

A portable computing device having a substantially non-conducting outer housing and alternative electrical grounding and audio system architectures is disclosed. The device can be a laptop computer having a main logic board, a keyboard assembly, an audio source positioned below the keyboard assembly, and an equalizer electrically coupled to the audio source, with each of these components being electrically coupled to a universal grounding structure. The audio source emits sound waves that are propagated through the keyboard assembly and between gaps between keyboard keys and the outer housing. Settings for the equalizer can be selected to account for sound absorption and amplification
(Continued)

characteristics of the sound waves along these sound transmission paths. The universal grounding structure includes a plurality of separate ground components that are electrically intercoupled, each being substantially smaller than the overall portable computing device, and also includes an electromagnetic interference shield around the main logic board.

18 Claims, 9 Drawing Sheets

Related U.S. Application Data continuation of application No. 12/580,985, filed on Oct. 16, 2009, now Pat. No. 8,553,907.

(58) Field of Classification Search
USPC ........ 361/679.27, 679.54, 752, 818; 343/702
See application file for complete search history.

(56) References Cited

U.S. PATENT DOCUMENTS

| | | | |
|---|---|---|---|
| 4,766,746 A | 8/1988 | Henderson et al. | |
| 5,237,486 A | 8/1993 | Lapointe et al. | |
| 5,265,274 A | 11/1993 | Knutson et al. | |
| 5,531,950 A | 7/1996 | Kimura et al. | |
| 5,606,438 A | 2/1997 | Margalit et al. | |
| 5,611,517 A | 3/1997 | Saadi et al. | |
| 5,795,430 A | 8/1998 | Beeteson et al. | |
| 5,796,578 A | 8/1998 | Jones | |
| 5,828,341 A | 10/1998 | Delamater | |
| 5,881,103 A | 3/1999 | Wong et al. | |
| 6,006,243 A * | 12/1999 | Karidis ................ G06F 1/1616 361/679.27 |
| 6,014,080 A | 1/2000 | Layson, Jr. | |
| 6,122,167 A | 9/2000 | Smith et al. | |
| 6,151,012 A | 11/2000 | Bullister | |
| 6,179,122 B1 | 1/2001 | Moncrief et al. | |
| 6,434,848 B1 * | 8/2002 | Gordon ................ E04F 21/04 33/379 |
| 6,483,719 B1 * | 11/2002 | Bachman ............... H05K 9/003 174/378 |
| 6,532,152 B1 | 3/2003 | White et al. | |
| 6,542,384 B1 | 4/2003 | Radu et al. | |
| 6,791,465 B2 | 9/2004 | Blagin et al. | |
| 6,846,228 B2 | 1/2005 | Lin | |
| 6,853,336 B2 | 2/2005 | Asano et al. | |
| 6,876,543 B2 | 4/2005 | Mockridge et al. | |
| 6,967,833 B2 | 11/2005 | Boykin et al. | |
| 6,999,826 B1 | 2/2006 | Zhou et al. | |
| 7,330,122 B2 | 2/2008 | Derrick et al. | |
| 7,342,792 B2 | 3/2008 | Kim et al. | |
| 7,369,191 B2 | 5/2008 | Okamoto et al. | |
| 7,388,161 B2 | 6/2008 | Hsieh et al. | |
| 7,522,889 B2 | 4/2009 | Wulff et al. | |
| 7,535,547 B2 | 5/2009 | Tannas, Jr. | |
| 7,545,574 B2 | 6/2009 | Park et al. | |
| 8,553,907 B2 | 10/2013 | Thomason et al. | |
| 9,829,930 B2 | 11/2017 | Thomason et al. | |
| 2001/0046119 A1 * | 11/2001 | Hamano ............... G06F 1/1616 361/679.54 |
| 2002/0037686 A1 | 3/2002 | Brown et al. | |
| 2002/0048148 A1 | 4/2002 | Horiuchi et al. | |
| 2002/0051346 A1 * | 5/2002 | Asano ................... G06F 1/1616 361/752 |
| 2002/0114134 A1 | 8/2002 | Skinner et al. | |
| 2003/0197111 A1 | 10/2003 | Morimoto et al. | |
| 2005/0069667 A1 | 3/2005 | Wacker | |
| 2005/0093752 A1 | 5/2005 | Cheng et al. | |
| 2005/0168958 A1 | 8/2005 | Finney et al. | |
| 2006/0062395 A1 | 3/2006 | Klayman et al. | |
| 2006/0066581 A1 * | 3/2006 | Lyon ...................... G06F 3/044 345/173 |
| 2006/0082956 A1 | 4/2006 | Garel et al. | |
| 2006/0268528 A1 | 11/2006 | Zadesky et al. | |
| 2007/0042644 A1 * | 2/2007 | Hsieh ................. H01R 13/6581 439/607.01 |
| 2007/0139876 A1 | 6/2007 | Na et al. | |
| 2007/0164879 A1 | 7/2007 | Wu | |
| 2007/0165373 A1 | 7/2007 | Merz et al. | |
| 2008/0026614 A1 | 1/2008 | Emerson et al. | |
| 2008/0055828 A1 | 3/2008 | Yang et al. | |
| 2008/0170723 A1 | 7/2008 | Sakagami et al. | |
| 2008/0187168 A1 | 8/2008 | Dam et al. | |
| 2008/0237477 A1 | 10/2008 | Hoggatt et al. | |
| 2009/0037632 A1 | 2/2009 | Downing | |
| 2009/0088055 A1 | 4/2009 | Silva et al. | |
| 2009/0146279 A1 | 6/2009 | Griffin | |
| 2009/0175001 A1 | 7/2009 | Mathew et al. | |
| 2009/0183819 A1 | 7/2009 | Matsuhira | |
| 2012/0165083 A1 | 6/2012 | Gong et al. | |

FOREIGN PATENT DOCUMENTS

| | | |
|---|---|---|
| EP | 1621967 | 2/2006 |
| JP | 2003174492 | 6/2003 |
| WO | 2009126480 | 10/2009 |

OTHER PUBLICATIONS

Final Office Action for U.S. Appl. No. 13/973,467 dated Jan. 5, 2017, 14 pages.
Non-Final Office Action for U.S. Appl. No. 13/973,467 dated Aug. 26, 2016, 15 pages.
Notice of Allowance for U.S. Appl. No. 13/973,467 dated Jul. 13, 2017, 8 pages.
"MacBook Air Review", Block, Available online at: http://www.engadget.com/2008/01/25/Marcbook-air-review, Jan. 25, 2008, 12 pages.
"PowerBook G4 (15-Inch FW 800), Sound Specifications", Available online at: https://support.apple.com/kb/TA27151?locale=en_US, Jan. 8, 2007, 1 page.
U.S. Appl. No. 12/580,985 , "Non-Final Office Action", dated Nov. 29, 2012, 10 pages.
U.S. Appl. No. 12/580,985 , "Notice of Allowance", dated Jun. 5, 2013, 12 pages.
U.S. Appl. No. 13/973,467 , "Final Office Action", dated Feb. 22, 2016, 14 pages.
U.S. Appl. No. 13/973,467 , "Non-Final Office Action", dated Sep. 28, 2015, 12 pages.
PCT/US2010/052563 , "International Search Report and Written Opinion", dated May 10, 2011, 23 pages.
PCT/US2010/052563 , "Invitation to Pay Additional Fees and, Where Applicable, Protest Fee", dated Feb. 15, 2011, 7 pages.

* cited by examiner

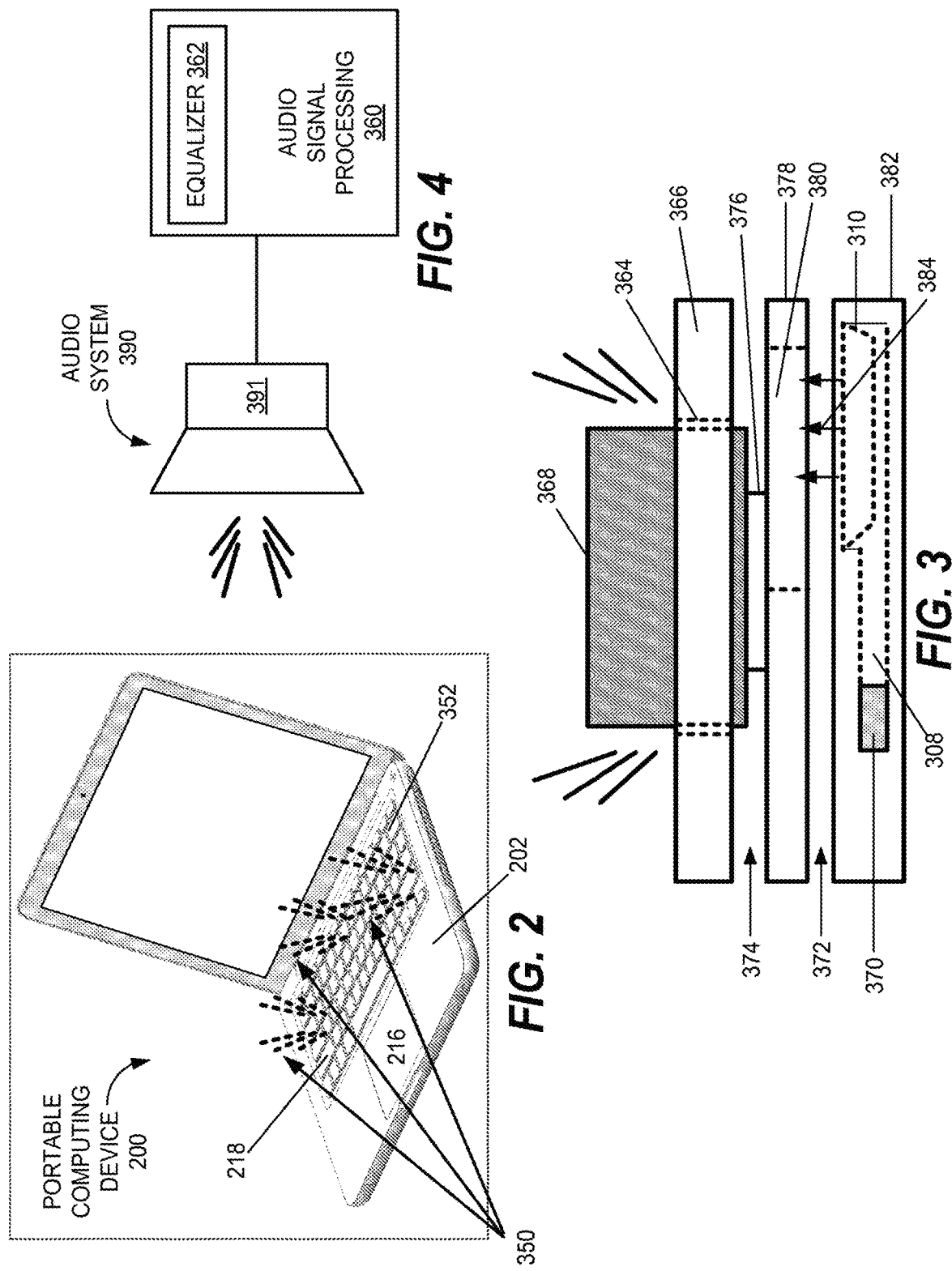

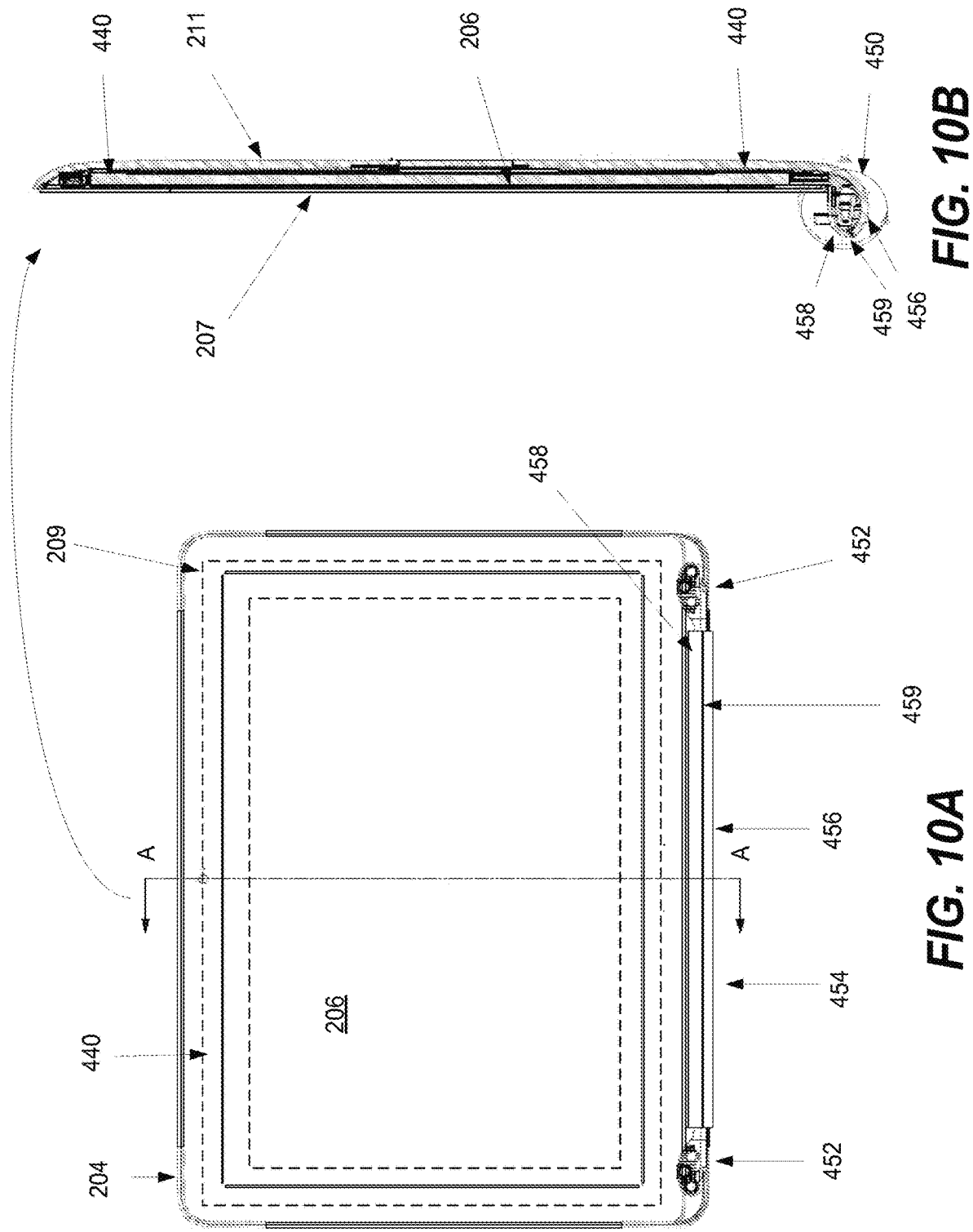

PORTABLE COMPUTER ELECTRICAL GROUNDING AND AUDIO SYSTEM ARCHITECTURES

CROSS-REFERENCES TO RELATED APPLICATIONS

This application is a divisional of U.S. patent application Ser. No. 13/973,467, filed Aug. 22, 2013; which is a continuation of U.S. patent application Ser. No. 12/580,985, filed Oct. 16, 2009, now U.S. Pat. No. 8,553,907. Each of these references is hereby incorporated by reference in its entirety for all purposes.

This application is related to and incorporates by reference herein in their entireties the following commonly owned U.S. Patent Applications that were filed Oct. 16, 2009:

(i) U.S. patent application Ser. No. 12/580,922 entitled "COMPUTER HOUSING" by Raff et al., now U.S. Pat. No. 8,111,505;

(ii) U.S. patent application Ser. No. 12/580,914 entitled "PORTABLE COMPUTER DISPLAY HOUSING" by Bergeron et al., now U.S. Pat. No. 8,233,109;

(iii) U.S. patent application Ser. No. 12/580,946 entitled "PORTABLE COMPUTER HOUSING" by Casebolt et al.;

(iv) U.S. patent application Ser. No. 12/580,934 entitled "METHOD AND APPARATUS FOR POLISHING A CURVED EDGE" by Lancaster et al., which claims priority under 35 U.S.C. 119(e) to U.S. Provisional Patent Application Ser. No. 61/249,200 entitled "COMPLEX GEOGRAPHICAL EDGE POLISHING" by Johannessen, filed Oct. 6, 2009, which is incorporated by reference herein in its entirety;

(v) U.S. patent application Ser. No. 12/580,881 entitled "SELF FIXTURING ASSEMBLY TECHNIQUES" by Thompson et al., now U.S. Pat. No. 8,333,862;

(vi) U.S. patent application Ser. No. 12/580,976 entitled "BATTERY" by Coish et al., now U.S. Pat. No. 8,199,469, which is a continuation in part of U.S. patent application Ser. No. 12/549,570, filed Aug. 28, 2009, which is incorporated by reference herein in its entirety;

(vii) U.S. patent application Ser. No. 12/580,886 entitled "PORTABLE COMPUTER DISPLAY HOUSING" by Bergeron et al., now U.S. Pat. No. 8,854,801; and (viii) U.S. patent application Ser. No. 12/580,927 entitled "COMPUTER HOUSING" by Raff et al., now U.S. Pat. No. 8,199,468.

TECHNICAL FIELD

The present invention relates generally to portable computing devices, and more particularly to methods and systems for providing electrical grounding and audio system architectures in laptop computers.

BACKGROUND OF THE INVENTION

The outward appearance of a portable computing device can be important to a user of the portable computing device. Design, heft, ease of portability, and overall aesthetic appearance are factors that many users consider when choosing a portable computing device for personal use. At the same time, the assembly and overall functionality of the portable computing device are also important to the user, since a durable assembly can extend the overall life of the device and thus increase its value to the user. Various factors that can be considered in the design of portable computing device components can include weight, strength, durability, cosmetic appearance, manufacturability, and thermal compatibility, among others. A component that is selected on the basis of its positive contribution to one of these design factors can have an adverse impact on one or more other factors.

One design challenge associated with the manufacture of portable computing devices is the design of the outer enclosures used to house the various internal computing components. This design challenge generally arises from a number of conflicting design goals that include the desirability of making the outer enclosure or housing lighter and thinner, of making the enclosure stronger, and of making the enclosure aesthetically pleasing, among other possible goals. Lighter housings or enclosures tend to be more flexible and therefore have a greater propensity to buckle and bow, while stronger and more rigid enclosures tend to be thicker and carry more weight. Unfortunately, increased weight may lead to user dissatisfaction with respect to clunkiness or reduced portability, while bowing may damage internal parts or lead to other failures. Further, few consumers desire to own or use a device that is perceived to be ugly or unsightly. Due to such considerations, portable computing device enclosure materials are typically selected to provide sufficient structural rigidity while also meeting weight constraints, with any aesthetic appeal being worked into materials that meet these initial criteria.

As such, outer enclosures or housings for portable computing devices are often made from aluminum, steel and other inexpensive yet sturdy metals having a suitable thickness to achieve both goals of low weight and high structural rigidity. The use of metal enclosures is also convenient from the standpoint of providing a ready electrical ground and/or a ready radio frequency ("RF") or electromagnetic interference ("EMI") shield for the processor and other electrical components of the computing device, since a metal enclosure or outer housing can readily be used for such functions. In the event that alternative materials might be desired for such outer housings, however, such as for alternative aesthetic appearances and/or lighter overall devices, then various complexities may arise with respect to the traditional grounding and/or EMI shielding functions traditionally provided by a metal enclosure.

Further electrical issues may also require consideration where a traditional metallic outer housing or enclosure is not used for a laptop, netbook, tablet, or other portable computing device. For example, any desired RF transmissions to or from the portable computing device may require alternative antenna considerations, as well as additional electromagnetic or electrical shielding with respect to any processing components in the same device. In addition to raising various potential electrical issues, the use of a non-metallic or otherwise non-conducting outer housing or enclosure for a portable computing device might also present alternative issues with respect to other components, such as, for example, audio systems, visual display presentations, and input and output ports, among others.

While many designs and techniques used to provide enclosures for portable computing devices have generally worked well in the past, there is always a desire to provide further designs and techniques for alternative aesthetically pleasing yet mechanically strong and lightweight portable computing device housings. In addition, there is an accompanying desire to provide any alternative schemes or structures that might be desirable due to any deviations from traditional portable computing device housings, such as with respect to overall electrical system, EMI or RF shielding and/or audio system considerations.

BRIEF SUMMARY OF THE INVENTION

It is an advantage of the present invention to provide portable computing devices that are lightweight, strong, reliable, aesthetically pleasing and distinctive. Such portable computing devices can have outer housings that are comprised of entirely or predominantly plastic or other non-conducing materials, while still maintaining performance with respect to the overall electrical grounding and audio systems. This can be accomplished at least in part through the use of one or more alternative approaches for grounding the electrical components and for positioning the audio sources and other audio components within the portable computing devices. Effective audio system architectures can include positioning one or more audio sources beneath the keyboard assembly such that sound is directed through gaps between keys and/or the housing. Efficient grounding system architectures can include reduced grounding regions that also shield or isolate the main logic board from RF emissions or interference.

In various embodiments, a portable computing device has a substantially non-conducting outer housing and alternative electrical grounding and audio system architectures. The portable computing device can have a main logic board, a keyboard assembly, an audio source positioned below the keyboard assembly, and an equalizer electrically coupled to the audio source, with each of these components being electrically coupled to a universal grounding structure. The audio source can emit sound waves that are propagated through the keyboard assembly and between gaps between keyboard keys and the outer housing. Settings for the equalizer can be selected to account for sound absorption and amplification characteristics of the sound waves along these sound transmission paths. The universal grounding structure can include a plurality of separate ground components that are electrically intercoupled, with each being substantially smaller than the overall portable computing device. The plurality of separate ground components can include an electromagnetic interference shield around the main logic board, a rear bracket that physically couples a top cover to a lower body of the portable computing device, a metal backplate positioned proximate to the main logic board, and/or a plurality of conductive pins positioned through the main logic board and coupling the metal backplate with the electromagnetic interference shield.

In various general embodiments, a laptop computer or other portable computing device can include an outer housing, a main logic board located within the outer housing and having a primary processing unit coupled thereto, one or more additional electrically powered components located within the outer housing and separate from the main logic board, and a universal grounding structure having a plurality of separate ground components that are electrically intercoupled. The outer housing can be composed of entirely or predominantly one or more electrically non-conducting materials, such as a thermoplastic. The universal grounding structure can be electrically coupled to each of the main logic board and the one or more additional electrically powered components. Further, each of the separate ground components can be substantially smaller than the overall computing device, and at least one of the separate ground components can also provide an electromagnetic interference shield around the main logic board.

In some embodiments, the electromagnetic interference shield can comprise a metal Faraday cage of a size that is slightly larger than the main logic board. Further, one of the ground components can comprise a rear bracket that couples a top cover of the portable computing device to a lower body of the portable computing device and transmits physical loads therebetween. Still further, one of the ground components can comprise a metal backplate positioned such that the main logic board is between the metal backplate and the separate electromagnetic interference shield. In addition, the metal backplate can be electrically and mechanically coupled to the electromagnetic interference shield via a plurality of conductive pins positioned through the main logic board.

In various general embodiments, an audio system for a portable computer is described. The audio system is configured to direct sound from one or more audio sources positioned beneath a keyboard. An equalizer is applied to the audio sources to provide a more aesthetically pleasing sound quality. The equalizer settings are selected to account for sound amplification and sound absorption characteristics associated with the sound transmission paths related to the positioning of the audio source relative to the keyboard and the structural design of the keyboard assembly and its integration into the housing of the portable component device.

In various detailed embodiments, an audio system includes three audio sources, two piezoelectric speakers, and an electromagnetically driven cone type speaker. Each of the audio sources directs sound through gaps in a keyboard associated with the portable computer. In a particular embodiment, the cone type speaker is incorporated in a component that is also configured to hold and allow connections to a wireless card. The component includes a chamber that is designed to enhance certain frequencies emitted from the cone type speaker.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and arrangements for the disclosed inventive apparatus and method for providing electrical grounding and audio system architectures in portable computing devices. These drawings in no way limit any changes in form and detail that may be made to the invention by one skilled in the art without departing from the spirit and scope of the invention.

FIG. 2 illustrates in right side front facing perspective view the exemplary portable computing device of FIG. 1 with audio signals being emitted from multiple audio sources via the keyboard according to one embodiment of the present invention.

FIG. 3 illustrates in side cross-sectional view an exemplary keyboard assembly having an audio source disposed therebeneath according to one embodiment of the present invention.

FIG. 4 provides a block diagram of an exemplary audio system according to one embodiment of the present invention.

FIG. 10A illustrates in front elevation view the lid of the exemplary portable computing device of FIG. 7 according to one embodiment of the present invention.

FIG. 10B illustrates in side cross-sectional view the lid of the exemplary portable computing device of FIG. 7 according to one embodiment of the present invention.

DETAILED DESCRIPTION OF THE INVENTION

Figure 1:
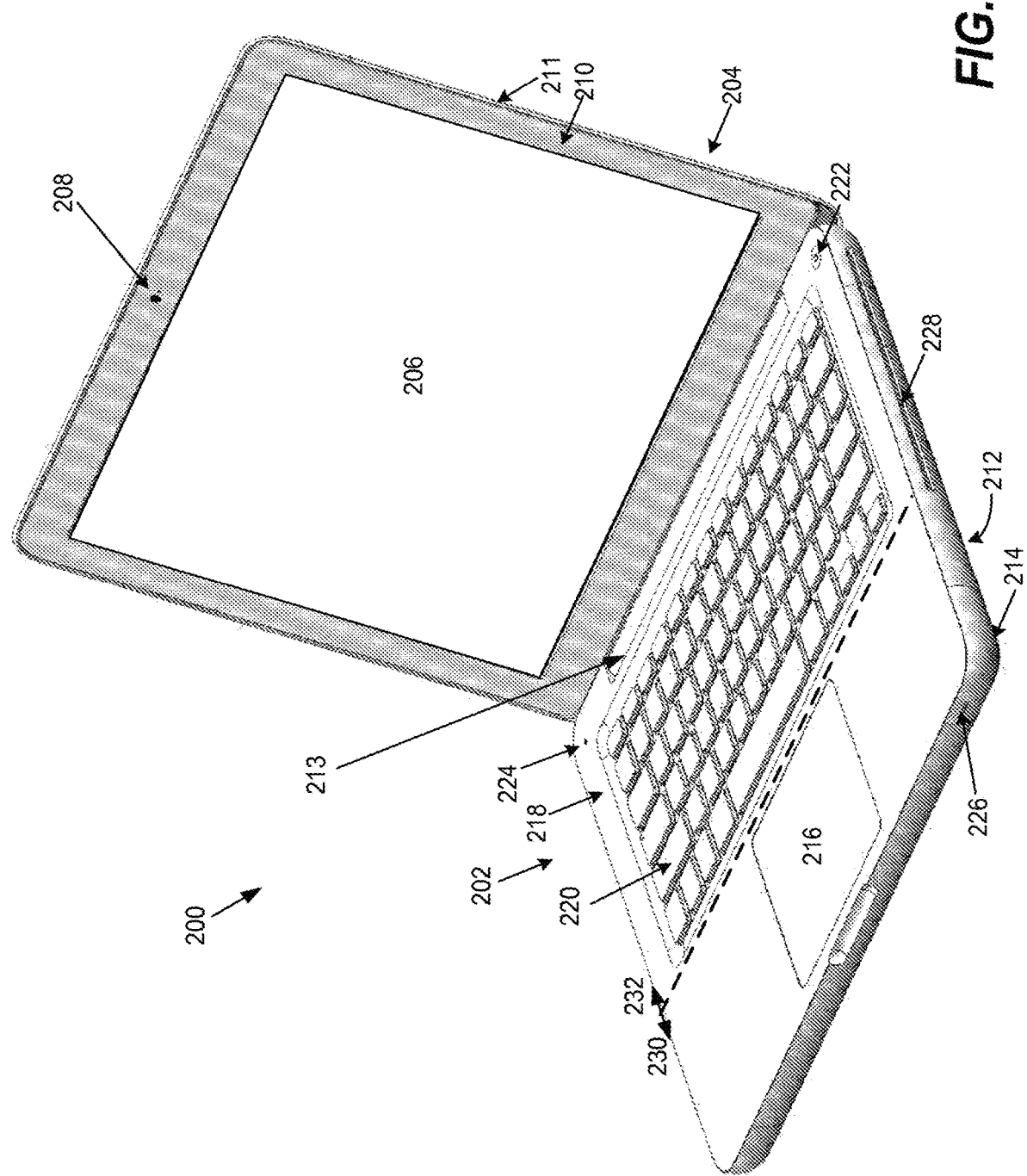
FIG. 1 illustrates in right side front facing perspective view an exemplary portable computing device in an open state according to one embodiment of the present invention.

Exemplary applications of apparatuses and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting; such that other embodiments may be used, and changes may be made without departing from the spirit and scope of the invention.

The invention relates in various embodiments to a portable computing device such as a laptop computer, netbook computer, tablet computer, and the like. The portable computing device can have an outer housing formed entirely or substantially from a non-electrically conducting material, such as a thermoplastic. In some embodiments, alternative audio system architectures can include positioning one or more audio sources beneath the keyboard assembly such that sound is directed through gaps between keys and/or the housing. In some embodiments, efficient grounding system architectures can include reduced grounding regions that also shield or isolate the main logic board from RF and/or other electromagnetic emissions or interference. These general subjects are set forth in greater detail below, starting with the outer housing, continuing to the audio system, and finishing with the electrical grounding system, as well as methods therefor.

Outer Housing

The following relates to a multi-part housing suitable for a portable computing device such as a laptop computer, netbook computer, tablet computer, and the like. The multi-part housing can include a structural support layer. The structural support layer can be formed of a strong and durable yet lightweight material. Such materials can include composite materials and/or metals such as aluminum. Aluminum has a number of characteristics that make it a good choice for the structural support layer. For example, aluminum is a good electrical conductor that can provide good chassis ground and it can be easily machined and has well known metallurgical characteristics. Furthermore, aluminum is non-reactive and non-magnetic which can be an essential requirement if the portable computer has RF capabilities, such as WiFi, AM/FM, and the like. In order to both protect the structural support layer and provide an aesthetically appealing finish (both visual and tactile), a protective layer can be placed on an external surface of the structural support layer. The protective layer can extend up and around an edge of the structural support layer to both enhance the aesthetic appeal of the housing and to protect the appearance of the portable computer. The protective layer can be formed of, for example, Thermoplastic Polyurethane ("TPU").

The multi-part housing can also include a body suitable for enclosing a computer assembly. The body can, in turn, include a cosmetic outer layer supported by an inner layer that can both transfer and distribute loads applied to the portable computing device. The outer layer can be formed of lightweight yet durable materials. Such materials can include, for example, blends of poly-carbonate and acrylonitrile butadiene styrene ("ABS" or "PCABS") that exhibit high flow, toughness and heat resistance well suited for portable applications. The inner layer can be formed of metal such as magnesium or magnesium alloy. The inner layer can be connected directly to the structural support layer forming a load path between the inner layer and the structural support layer. In this way, a load applied to the portable computing device can be distributed across the inner layer and transferred along the load path to the structural support layer without substantially affecting the cosmetic outer layer. Since the cosmetic outer layer does not have to be load tolerant, the cosmetic outer layer can be formed of flexible, but aesthetically pleasing materials such as lightweight plastic that would otherwise be unsuitable for use with a conventional portable computer housing. In the embodiments where the inner layer is metallic or at least electrically conductive, the inner layer and the structural support layer can, taken together, provide a suitable electrical ground plane or chassis ground. This can be especially important due to the fact that by selecting a plastic or other non-conducting material for the cosmetic outer layer, the cosmetic outer layer cannot provide a suitable ground. Moreover, due to the close proximity of the operational components to one another in the portable computing device, it is highly desirable to isolate sources of significant RF radiation, such as a main logic board ("MLB"), from those circuits, such as wireless circuits, that can be highly sensitive to RF interference. In this way, the inner layer can include a metal frame that can, in combination with the structural support layer, be used to electromagnetically isolate the MLB from other components in the computer assembly sensitive to RF interference such as a WiFi circuit.

Since the cosmetic outer layer is essentially load isolated, the choice of materials that can be used to form the cosmetic outer layer can be widely varied. In this way, a product designer can create a look and feel for the portable computer well beyond anything realistically possible with a conventional computer housing. For example, the cosmetic outer layer can be formed of lightweight thermoplastic and molded into any shape (such as an undercut shape). Since the cosmetic outer layer does not provide much, if any, structural support for the portable computer, the shape of cosmetic outer layer can also be widely varied. For example, the cosmetic outer layer can present a continuous spline profile so as to appear to an observer to be a single unified shape with substantially no discontinuities. Moreover, since there is no need for external fasteners that would detract from the overall appearance of the portable laptop computer, the overall look and feel presented by the cosmetic outer layer can be one of a simple continuous shape.

Again, since the cosmetic outer layer does not carry substantially any loads, the cosmetic outer layer can include a number of openings having wide spans that do not require additional support structures. Such openings can take the form of ports that can be used to provide access to internal circuits. The ports can include, for example, data ports suitable for accommodating cables (USB, Ethernet, FireWire, etc.) connecting external circuits. The openings can also provide access to an audio circuit, video display circuit, power input, and the like.

The portable computer can also include a movable cover. The movable cover can include an inner frame supporting a cosmetic outer layer. The inner frame can in much the same way as the inner layer of the body, distribute and transfer a load applied to the movable cover. In the described embodiments, the inner frame can be formed of materials that are strong, lightweight and electrically conductive. Such materials can include, for example, aluminum, magnesium and/or magnesium alloys. By connecting the inner frame to the inner layer of the body, the inner frame can become part of the load path to the structural support layer. In this way, any load applied to the movable cover can be distributed across the inner frame and transferred to the structural support layer by way of the inner layer of the housing. For example, the movable cover can take the form of a lid that can be opened to reveal a portion of the body and closed to hide the portion of the body. By connecting the inner frame to the inner layer of the body using connectors, such as hinges, the inner frame can become part of the load path. In this way, a load imparted to the lid such as when the lid is opened (or closed), for example, can be transferred along the load path from the lid to the structural support layer.

The structural support layer can be mechanically connected to the body inner layer by way of any number and type of fasteners. Such fasteners can include screws, rivets, and the like. In this way, the inner layer and the structural support layer can become essentially a single unit. The body can be thought of as having a front portion and a rear portion depending upon, for example, the expected operational orientation of the portable computer. For example, if the portable computer is a laptop that has a touch or track pad, then that portion of the body that includes the touch pad can be considered to be the front portion (as viewed by a user when actually using the laptop), and conversely, a keyboard can be considered to be part of the rear portion. Since the cosmetic outer layer is typically formed of flexible material, such as plastic, that is easily bent and deformed, the flexibility inherent in the choice of material for the body must be substantially reduced or eliminated in the finished product in order to protect internal components, such as a main logic board, or MLB, that could be damaged by such flexing.

Certain of the operational components installed within the body can each function both as an operational component as well as a structural support component. However, these dual purpose components are limited to those components that in and of themselves are structurally resistant to flexion. Such components can include, for example, an enhanced load bearing battery, a hard disc drive ("HDD"), an optical disc drive ("ODD"), a touch pad support, and so forth. Accordingly, these dual purpose components can be located in the front portion of the body consistent with the location of the touch pad, for example. In order to mount these components into the body, support features can be attached directly to an interior surface of the cosmetic outer layer using, for example, glue or other appropriate adhesive. The support features can then be used to mount the dual purpose operational components into the body during an assembly operation. For example, dual purpose operational components can be installed using metal pin adapters that can be inserted into corresponding metal bosses formed in an appropriate structural component glued to the interior surface of the cosmetic outer layer. In this way, there are no plastic bosses into which metal screws are attached thereby greatly enhancing long term structural integrity of the computer housing.

The rear portion of the body can include a frame formed of metal such as for example, magnesium or magnesium alloy mounted to an upper inside surface (onto which the keyboard is mounted) of the cosmetic layer. The metal frame can be used to support those components, such as the MLB, that cannot be used to provide additional support for the body. The metal frame can also provide a local ground plane as well as to help distribute as well as transfer loads applied to the portable computing device at either the display or the body itself. In one embodiment, the metal frame can be shaped to include a spanning portion used to transfer loads around the openings in the cosmetic outer layer. In this way, the openings can have wide spans without the need for additional support at the cosmetic outer layer. The rear portion of the body can also include a rear bracket. The rear bracket can connect directly to the structural support layer as part of the load path. The rear bracket can also include venting features along the lines of a baffle suitable for allowing the passage of air between the operational components within the body and the external environment. The rear bracket can be formed of metal such as magnesium having a number of attachment features that can be used to attach the rear bracket to the structural support layer to form the load path. The rear bracket can also include attachment features allowing additional portions of the portable computer, such as a cover having a display, to become part of the load path. For example, at least one attachment feature can be coupled to a hinge assembly that allows a user to open and or close the cover where any loads generated are transferred to the structural support layer by way of the load path.

Audio System Architecture

More specific examples, particularly with respect to alternative audio system architectures, will now be provided.

Referring first to FIG. 1, an exemplary portable computing device in an open state is illustrated in right side front facing perspective view. Portable computing device 200 can include body 202 and lid 204 having display 206. Lid 204 can be moved by a user from a closed position to an open position as shown. Display 206 can display visual content such as a graphical user interface, still images such as photos as well as video media items such as movies. Display 206 can display images using any appropriate technology such as a liquid crystal display ("LCD"), organic LCD ("OLCD") and the like. Portable computing device 200 can also include image capture device 208 located on lid 204. Image capture device 208 can be configured to capture both still and video images. Compliant display trim 210 formed of suitable compliant material can be supported by structural components (not shown) within lid 204 but attached to cosmetic cover 211 of lid 206. Not attaching compliant display trim 210 directly to a structural component provides for good registration between the cosmetic rear cover 211 of lid 206 and compliant display trim 210. Display trim 210 can enhance the overall appearance of display 204 by hiding operational and structural components as well as focusing a user's attention onto the active area of display 206. Lid 204 can be coupled to body 202 using a hinge assembly (hidden by clutch barrel 213) that in turn can be connected by way of a load path to structural support layer 212. Structural support layer 212 can be formed of composite material or metal such as aluminum. Structural support layer 212 can be covered by protective layer 214 formed of protective yet durable material that is both attractive to the eye and the touch. Protective layer 214 can be formed of TPU that extends up and over an edge of structural support layer 212 to form a seal with body 202. The seal providing both protection from contaminants from the external environment as well as an appearance of continuity in the shape of body 202.

Body 202 can include a number of user input devices such as touch pad 216 and keyboard 218. Keyboard 218 can include a plurality of key pads 220 each having a symbol imprinted thereon for identifying to a user the key input associated with the particular key pad. Keyboard 218 can be arranged to receive a discrete user input at each keypad using a finger motion referred to as a keystroke. In the described embodiment, the symbols on each key pad can be laser etched thereby creating an extremely clean and durable imprint that will not fade under the constant application of keystrokes over the life of the portable computing device 200. Touch pad 216 can be configured to receive a user's finger gesturing. A finger gesture can include touch events from more than one finger applied in unison. The gesture can also include a single finger touch event such as a swipe or a tap.

Body 202 can also include power button 222 arranged to assist the user in turning on and turning off portable computing device 200. Audio input device 224 can be used as a microphone to receive audible input such as speech. Status indicator light (SIL) 226 can be used to provide a user with information. Such information can be related to, for example, an operational status of portable computing device 200. Since body 202 can be formed of semi-translucent plastic material that can transmit a noticeable portion of light (referred to as light bleed), SIL 226 can be configured to substantially eliminate all light except that confined by the geometric confines of SIL 226. Body 202 can also include openings used for accessing operational circuits mounted within housing 202. For example, disc slot 228 can be used for inserting disc media such as compact discs (CDs) and or digital versatile discs (DVDs).

As a convention, body 202 can be considered to be divided into front portion 230 and rear portion 232 as viewed by a user when operation portable computing device. In this way, touch pad 216 can be considered to be located in front portion 230 and keyboard 218 can be considered to be located in rear portion 232. The significance of the location of touch pad 216 and keyboard 218 will be discussed in more detail below with regards to the configuration of a inner layer of body 202.

Continuing now with FIG. 2, the exemplary portable computing device of FIG. 1 is shown in right side front facing perspective view with audio signals being emitted from multiple audio sources via the keyboard. To provide audio signals to a user, such as music and sounds, associated with various applications that can be executed on the portable computing device, one or more audio sources can be provided. The one or more audio sources can be located within the body 202. Three audio sources emitting audio signals 350 are shown in the FIG. 2 for purposes of illustration, although it will be readily appreciated that more or fewer audio sources may be used, as desired.

In one embodiment, the gaps between the keys of keyboard 218, including various keys such as key 352, allow audio signals generated within the body 202 to be propagated away from the portable computing device 202. In other embodiments, other apertures in the body 202 can be used to provide an audio propagation path from the interior of the body to the exterior. For example, as is described with respect to FIG. 6 below, vents used for air cooling of the processor can also be used to propagate audio signals from the interior of the body 202.

One advantage of using the gaps between the keys of the keyboard 218 as a path for propagating audio signals can be that additional apertures do not have to be added to the body 202 for the purposes of sound propagation. The removal of dedicated apertures for sound propagation purposes can provide a design that is considered more aesthetically pleasing. In addition, manufacturing costs can be reduced since the machining of body 202 is reduced. Further, the removal of the dedicated apertures can eliminate potential entry points for dust and liquid that can adversely affect the electrical components housed within the body 202.

FIG. 3 is a cross section of an exemplary keyboard assembly 378 with an audio source disposed below the key board assembly. The figure includes a key 368 mounted to a support structure 376 that is attached to the keyboard substrate 378. The key 368 can be actuated towards the keyboard substrate by applying a force to the top surface of the key 368. An aperture slightly larger than the key 368 is provided in an outer layer 366 of the body 202 to accommodate actuation of the key 368.

In one embodiment, an audio source 310 can be disposed below the keyboard assembly substrate 378. The audio source 310 is shown located in substrate 382 for the purposes of illustration and is not limited to this location. For instance, in one embodiment, the audio source 310 can be integrated into the keyboard assembly, such as integrated into or mounted on top of the substrate 378 rather than in a separate component as shown in FIG. 3. Further, an audio source can be located below various keys in the keyboard 218 and is not limited to a particular key location.

In one embodiment, an audio source is positioned proximately below the 'F6' key on the keyboard, but is not limited to this location. It can be desirable to locate the audio source below a key that is not frequently used, such as a key on the periphery of the keyboard to avoid absorption of sound by the hands of a user utilizing the keyboard. For instance, when an audio source is located near the top of the keyboard, such as below a function key, the hands of a user are typically below this position during normal operation.

When the audio source 310 is mounted below the keyboard assembly, the substrate 378 of the keyboard assembly can include an aperture 380 located above the audio source to provide an audio transmission path for the audio signals generated by the audio source through the keyboard substrate 380. The audio signals refer to the sound waves generated by the audio source, such as 310. In various embodiments, one or more apertures through the keyboard substrate 380 can be provided, such as a number of small apertures or a single large aperture.

In a particular embodiment, a chamber of air 308, such as a tube, can be connected to the audio source 310 to enhance (e.g., amplify) one or more audio signal frequencies emitted from the audio source 310. One end of the chamber can receive audio signals generated from the audio source where propagation of the audio signals through the chamber can enhance one or more audio signal frequencies, such as by producing harmonics. The size and dimensions of the chamber 308 can be selected to produce a desired enhancement to the frequency response of the audio source 310. In one embodiment, the chamber 308 is sized to enhance lower audio signal frequencies in the frequency response of audio source 310. In various embodiments, audio sources 310 with or without one or more chambers configured to alter a frequency response of the audio source can be utilized.

The chamber 308 includes an exit port 370. The exit port 370 can include a cover, such as a mesh cover, that can alter the audio signals emitted from chamber 308. The driver for the audio source 310 is shown in a configuration where the primary direction 384 of the emitted audio signals (sound waves of various frequencies) is towards the bottom of the key 368. The exit port 370 is shown in an orientation where the primary direction of the emitted sound waves is in a direction that is perpendicular to that of the driver of the audio source 310.

In general, the primary directions of the emitted audio source and exit port 370 of chamber 308 can be directed to take advantage of any audio transmission paths that can result from or lend themselves to the packaging of the various internal components of the portable computing device and are not limited to a location below the keyboard. For instance, in one embodiment, the primary direction of the audio source 310 is through the keyboard 218 while the exit port associated with chamber 308 is aligned with vents used to provide air circulation and cooling to the main logic board located on a side of the body 202. In addition one or more audio sources can be located in the movable portion of the portable computing device 200 including the display.

In yet other embodiments, an audio source, such as 310, can be coupled to a chamber with an exit port 370. The primary directions of the audio signals emitted from the driver of the audio source 310 and the exit port 370 can be selected to take advantage of desired audio transmission paths and can be orientated any configuration relative to one another. As examples, the exit port 370 can be aligned such that emits audio signals in generally the same direction as the driver of the audio source 310, it can be orientated so that it primarily emits audio signals in an opposite direction (e.g., away from key 368), or the exit port 370 (as shown) can direct audio signals in a direction perpendicular to the audio source 310.

In FIG. 3, a primary direction 384 of the audio signals emitted from the driver of the audio source 310 is parallel to the alignment of gap 364 and perpendicular to a top surface of the driver of the audio source 310 and a top surface of the key 368. In other embodiments, the primary direction 384 can be in other directions. For example, the driver for the audio source 310 can be tilted such that the primary direction 384 of the audio source is no longer parallel to the direction of the gap 364. In particular, the primary direction 384 can be tilted toward the touch 216 (as shown in FIG. 2) to potentially direct more sound to a user of the portable computing device.

In FIG. 3, after audio signals or sound waves are emitted from audio source 310, the sound waves can propagate through various paths within the body 202 of the portable computing device. For instance, sound waves can propagate along paths from the driver of audio source 310, through the gap 372 between the substrate 384 of the audio device 310 and the substrate 378 of the keyboard assembly, through one or more apertures 380 in the substrate 278 of the keyboard assembly, through a gap 374 between the substrate 380 of the keyboard assembly and the outer layer 366 of the body 202 and exit the body 202 between gaps, such as 364 between a key, such as 368, and the outer layer 366 of the body. Some sound waves emitted from the audio source can be absorbed and/or reflected as they propagate from audio source 310 through the interior of the body 202 to the exterior of the body 202 increasing/or decreasing sound levels for certain frequencies emitted from the audio source 310. Further, various harmonics of the sound waves may be created. These harmonics can potentially cause unwanted vibrations or noises.

The amount that a particular sound wave is affected during its propagation through the body 202 can depend on the frequency of the wave, material properties of various components along its transmission path, such as how much sound energy various materials absorb or reflect as a function of frequency, spacing between layers, such as gaps 372 and 374, spacing between the keys, such as 364 and an outer layer 366 of the housing and the key 368 and a size and number of apertures in substrate 378. Thus, a frequency response of audio source 310 that is measured in a free standing configuration when it is not installed in the body 202 can be quite different than a frequency response of the audio source 310 measured at some point above the keyboard 218 when it is installed within the body 202.

In some embodiments, an equalizer can be applied to the electrical signals sent to the driver of the audio source, 310, installed within the body 202 of the portable computing device 200 to improve the sound quality detected outside of the body from the audio source 310, such as the sound quality detected by a user of the portable computing device. The equalizer can be applied such that the frequency response of audio source 310 is altered. The application of the equalizer can result in certain frequencies being increased in amplitude and other frequencies being decreased when sounds, such as music, are output via the audio source 310.

Turning next to FIG. 4, a block diagram of an exemplary audio system according to one embodiment of the present invention is provided. Audio system 390 can include one or more audio sources, such as 391, and audio signal processing 360 including equalizer 362. The audio source can be a loudspeaker that includes one or more electroacoustic transducers that convert electric signals into sound waves that are propagated through a medium such as air. The transducer portion of a loudspeaker can be referred to as a driver. A conical diaphragm driven by an electromagnetic interaction and a piezoelectric material that vibrates in response to an application of electricity are two examples of types of transducers that can be utilized with the audio system 390 described herein. The audio signal processing 360 can refer to various combinations of hardware and/or software that transform audio data encoded in a particular format, such as a digital format, to an electrical signal that is compatible with a particular design of an audio source, such as 310, used with the portable computing device.

At some point in the conversion of the audio data encoded in a particular format to the signal received by the audio source, the equalizer 362 can be applied such that the electrical signal sent to the audio source is altered. The equalizer 362 can be applied to produce a more aesthetically pleasing sound quality from the audio source, such as 391, when it is detected outside of the body 202 of the portable computing device. Also, some equalizer 362 functions can be applied to reduce unwanted vibrations and buzzing noises that can result from normal operation of an audio source. Different equalizers can be used for different audio sources to account for the frequency response of the audio source as well as its associated sound transmission paths that can be unique to the location where the audio source is installed in the body 202.

In other embodiments, different equalizers can be used for different audio data, such as music or a type of music. In a particular embodiment, the type of audio data that is being output can be detected and an equalizer associated with an audio source can be adjusted to account for the type of audio data. In another embodiment, the equalizer, such as 362, for a particular audio source can be dynamically adjusted depending on whether it is determined whether the keyboard is being actively used or not. The placement of the hands of a user over the keyboard can alter detected sound quality from an audio source transmitted through the speaker. Further, the transmission of sound through the keyboard can produce tactile sensations in the keyboard that can be undesirable to a particular user. Thus, it can be desirable to alter the equalizer, such 362, for a particular audio source, such as 391, transmitting through the keyboard when the keyboard is being actively used.

Figure 5:
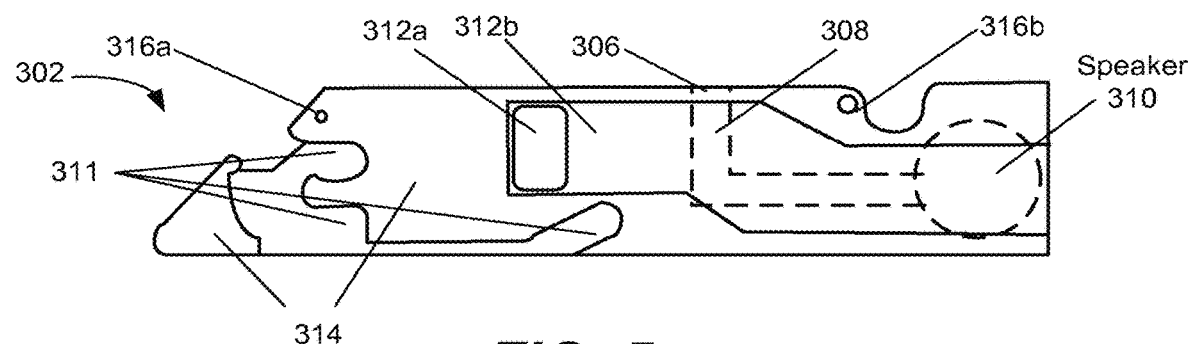
FIG. 5 illustrates in side elevation view an exemplary inner component of the portable computing device configured to support a wireless card and an audio source according to one embodiment of the present invention.

FIG. 5 is a diagram of an inner component 302 of the portable computing device 200 configured to support a wireless card (not shown) and an audio source 310. The component 302 can be formed from a material such as plastic. In particular embodiment, the inner component 302 includes two attachment points 316a and 316b that allow a fastener, such as screw to be inserted. A bottom surface of the component is indicated by surface 314. The bottom surface 314 can be cut out 311 to allow for connections to a wireless card inserted on the top side of component 302 opposite the bottom surface 314. A cut out 311 allowing for three connections is shown in FIG. 5. The bottom surface includes an addition cut out 312a through the surface 314 and a slot 312b in surface 314.

The slot 312b provides a path for ribbon cable and the cutout 312a allows the ribbon cable to be attached to the wireless card. The component 302 includes a loudspeaker 310. In a particular embodiment, the loudspeaker includes a cone type driver driven by an electromagnetic interaction. A chamber 308 with an exit port 306 is acoustically connected to speaker 310. The chamber 308 can be sized to enhance a frequency response of the speaker 310, such as a lower frequency response. In this embodiment, the size of the chamber 308 is limited by the placement of the wireless card. The placement of the wireless card limits a potential length of the chamber 308, i.e., the distance from the speaker to the exit port 306. The tube 308 is not necessarily rectangular and can be curved shaped in some embodiments.

Figure 6:
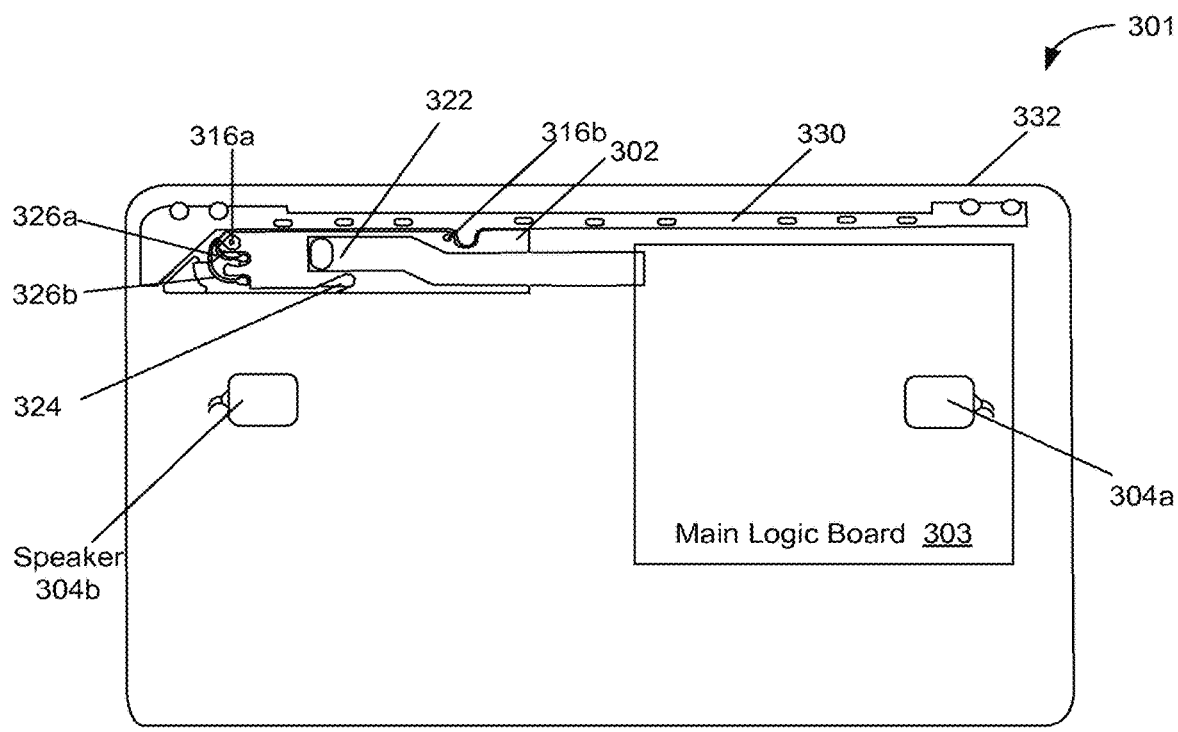
FIG. 6 illustrates in top plan view the exemplary inner component mounted within a body of the portable computing device according to one embodiment of the present invention.

Moving next to FIG. 6, an exemplary inner component 302 mounted within a portion 301 of body 202 of the portable computing device 200 is illustrated in top plan view. In this diagram, a lower cover of the body 202 is removed. The opposite side of the body 202 includes apertures for allowing the keys of a keyboard assembly to be actuated. The component 302 is shown in an installed position within the portion 301. The component is positioned next to a structural stiffener 330.

The component 302 is positioned such that the speaker 310 directs sound through the keyboard on the opposite side. In one embodiment, as described above, the speaker can be positioned below the 'F6' key of the keyboard. The exit port 306 is positioned such that sound from chamber 308 is directed toward a backside 332 of the portion 301. The backside is where the body 202 and a display portion of the portable computing device are coupled together via hinge and can include ports for providing air circulation for cooling of the portable cooling device. The sound from the chamber 308 can be directed out one of more these ports.

A wireless card 324 is shown inserted in the component 302 in FIG. 6. The two connectors 326a and 326b are shown connected to the wireless card 324. A ribbon line connector 322 is also shown connected to the wireless card 324 and the main logic board 303. Two additional speakers 304a and 304b are shown attached to the portion 301 of the body 202. In one embodiment, the speakers 304a and 304b can be piezoelectric speakers. In a particular embodiment, the speakers 304a and 304b can also be positioned to direct sounds through the keyboard on the opposite side. In this configuration, speakers 310, 304a and 304b may not be visible when a user is looking at the keyboard. Again, it will be understood that more or fewer speakers may be used, some of all or which are similarly positioned beneath the keyboard.

Electrical Grounding System Architecture

Specific examples with respect to alternative electrical grounding architectures will now be provided. In particular, the following alternative electrical grounding structures can prove to be particularly useful for portable computing devices that employ outer housings that are not electrically conductive. Again, such portable computing devices can include, for example, a laptop computer, netbook computer, tablet computer, and the like. It will be understood that the following alternative electrical grounding structures can be utilized separate from or in addition to the various audio system architectural components set forth in greater detail above. In some arrangements, one or more components can provide functionalities with respect to both of the electrical grounding and audio system architectures.

In general, the provided examples can avoid the traditional method of employing the entire enclosure or outer housing as a total Faraday shield and/or ground plane for the portable computing device. This is particularly useful where the enclosure or outer housing is composed entirely or predominantly of a thermoplastic or other non electrically conducting material. Instead, a plurality of localized and smaller grounding regions and EMI/RF shields can be applied within the portable computing device. These smaller localized grounding regions can be electrically intercoupled with each other to form an overall ground plane or universal grounding structure for the entire device. Further, one or more of these localized grounding regions and/or the electrical couplers therebetween can also provide one or more additional functions for the portable computing device, such as structural supports, hinges, brackets, and clutches, among other possibilities.

Figure 7:
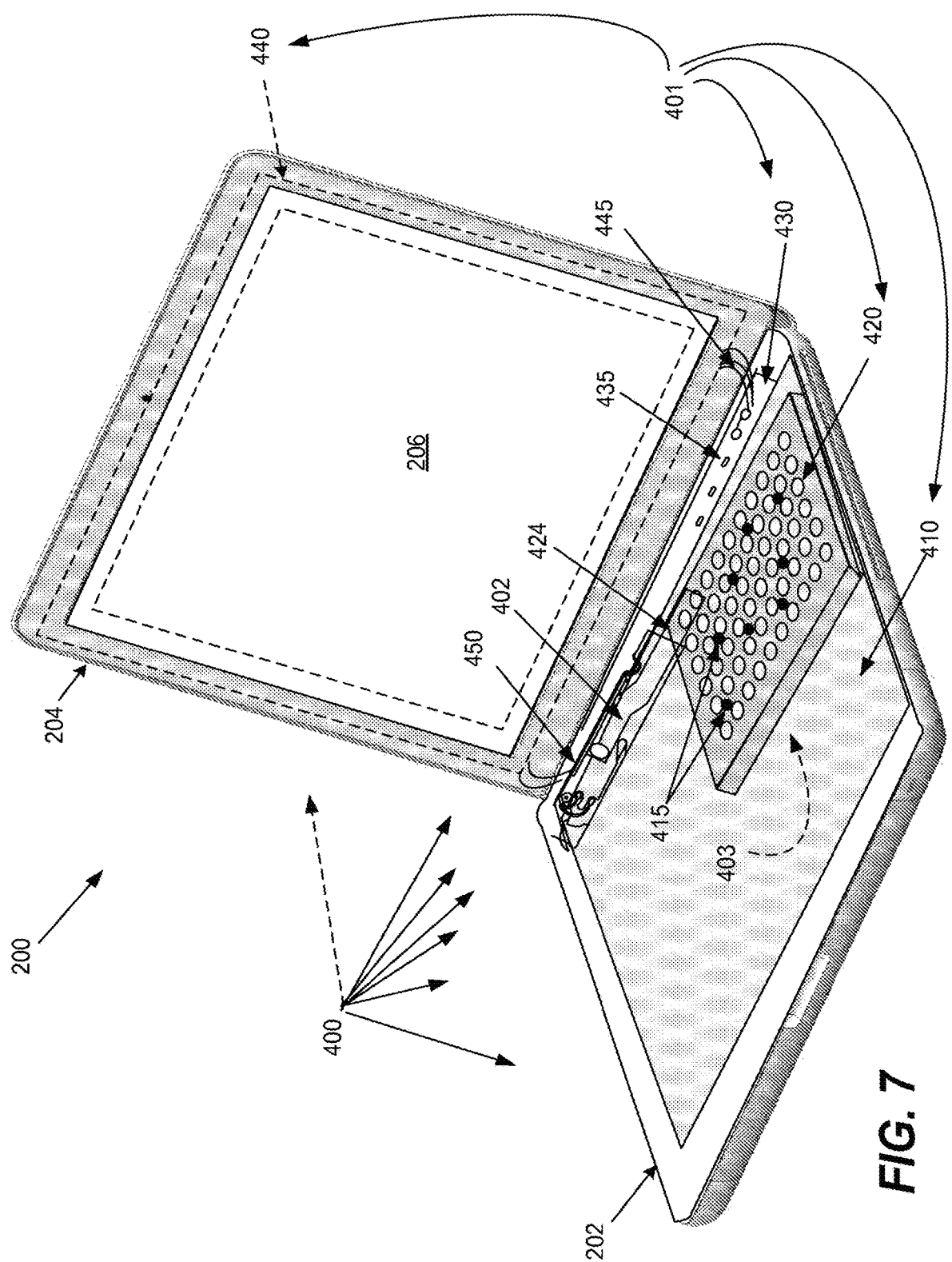
FIG. 7 illustrates in right side front facing perspective view an exemplary overall electrical grounding architecture for a partially disassembled portable computing device having a non-conductive outer housing according to one embodiment of the present invention.

Turning now to FIG. 7, an exemplary overall electrical grounding architecture for a partially disassembled portable computing device having a non-conductive outer housing is illustrated in right side front facing perspective view. Portable computing device 200 can be, for example, a laptop computer, and can again include a body 202 and movable lid 204 having a display 206. Numerous additional features and components of portable computing device 200 are set forth in greater detail above, and will not be discussed further unless relevant to the electrical grounding system architecture. Some components of computing device 200 have been removed from FIG. 7 for purposes of illustration, including the keyboard, touchpad and display screen, among others. Universal grounding structure 400 provides an overall ground plane for portable computing device 200, which overall ground plane can be comprised of a plurality of separate ground components 401. These separate ground components 401 can be localized to different regions of the portable computing device, and can be electrically intercoupled by various electrical connectors, such that a universal ground plane for the entire device is created.

Separate ground components comprising localized ground regions can include, for example, backplate 410, MLB frame 420, rear bracket 430, and display chassis 440. Electrical connectors that can be used to couple these various localized and separate ground components to form an overall device ground plane can include, for example, MLB 403, a plurality of grounding pins 415, a plurality of rear bracket tabs 435, display chassis wiring 445, and a ribbon line connector 424 coupled to a sound component 402 that is in turn coupled to a display clutch assembly 450. It will be readily appreciated that additional or fewer separate ground components may exist or be designated as part of universal grounding structure 400, and that various electrical connectors, such as any of the foregoing exemplary electrical connectors, may be resized, rearranged or otherwise designated as separate ground components themselves within the universal grounding structure. Similarly, additional or fewer electrical connectors may be used to intercouple the various localized separate ground components of universal grounding structure 400.

One benefit that can be realized by having multiple localized grounding regions rather than a traditional single ground plane comprising a conductive outer housing is that appropriate focus can be applied with respect to the grounding needs of particular components, such that material costs may be reduced. Such reductions can be enhanced by utilizing one or more already existing components that provide other functions as part of the universal grounding structure 400. While this may result in some design alterations and/or extensions of certain components, the overall need to resort to added metal or other conductive structures just to provide a universal ground plane is reduced or eliminated. Notably, various smaller localized ground regions are created, with none of these regions being so traditionally large as the entire enclosure or outer housing.

Figure 8A:
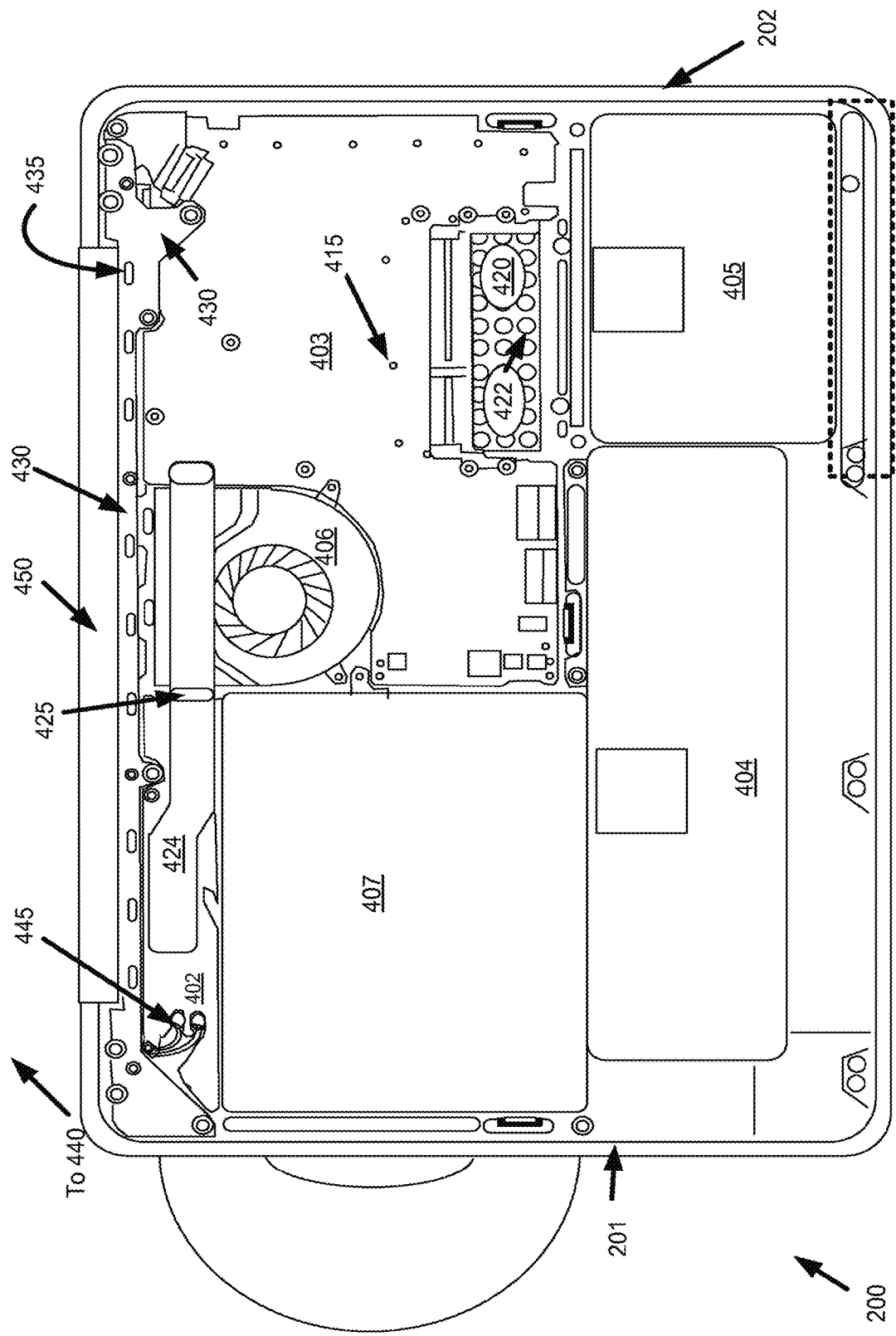
FIG. 8A illustrates in bottom plan view the body of the exemplary portable computing device of FIG. 7 as partially disassembled according to one embodiment of the present invention.
Figure 8B:
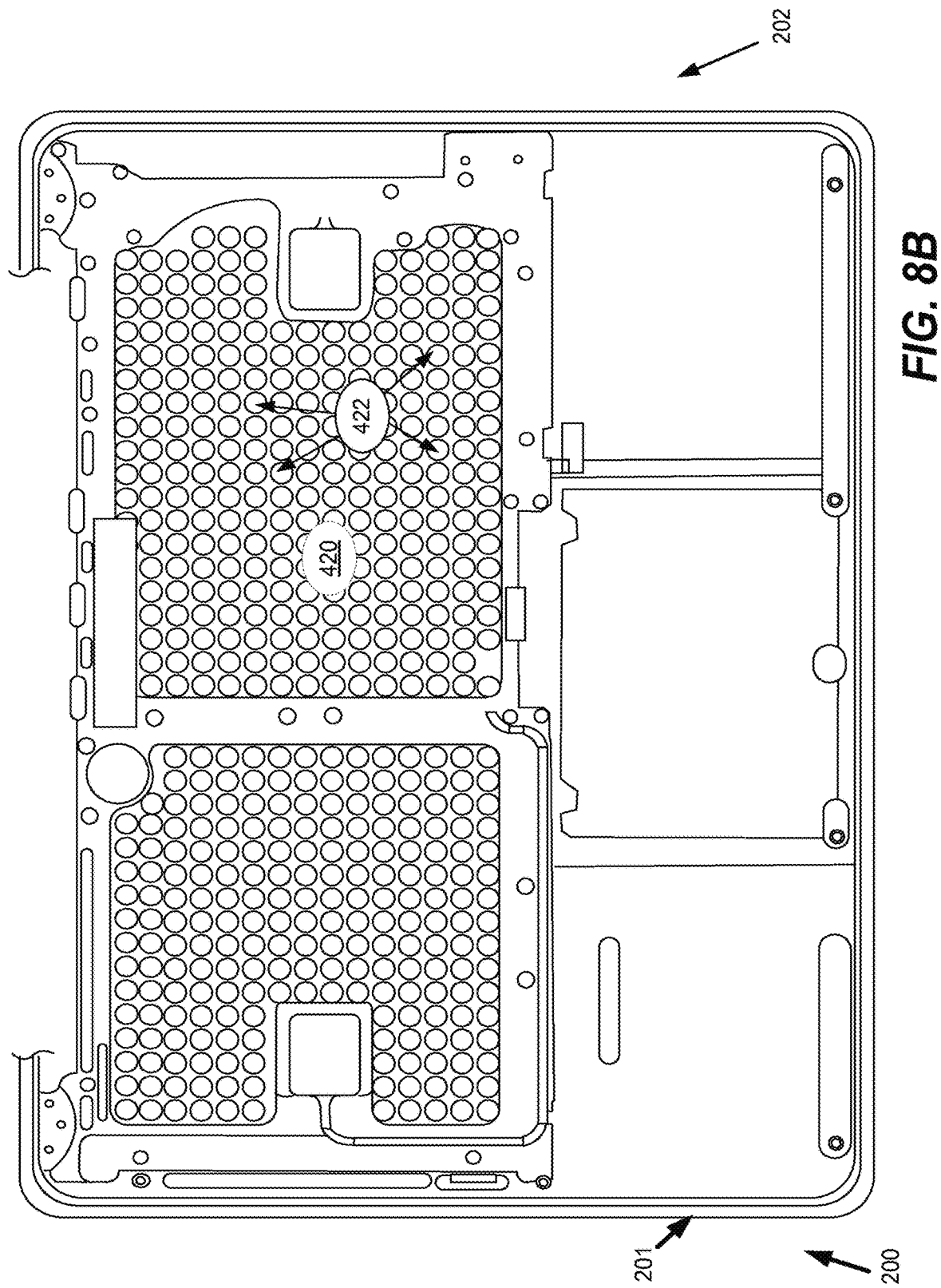
FIG. 8B illustrates in top plan view the body of the exemplary portable computing device of FIG. 7 as partially disassembled according to one embodiment of the present invention.

Moving next to FIGS. 8A and 8B, the body of the exemplary portable computing device of FIG. 7 is shown as being partially disassembled in bottom plan and top plan views respectively. Further details of the various separate ground components, electrical connectors and other device components can be seen with the bottom housing removed in FIG. 8A and the keyboard, touchpad and upper housing removed in FIG. 8B. For purposes of illustration, the bottom of the outer housing has been removed in FIG. 8A to reveal various components internal to body 202. As such, the bottom outer housing portion and coupled backplate 410 are not shown in FIG. 8A. It will be understood that backplate 410 exists at about the level of the page of this figure, as FIG. 8A is looking into the body 202 from the bottom of device 200. As shown, portable computing device 200 can have a number of typical electrical components, such as a main logic board ("MLB") 403, battery assembly 404, hard disc drive ("HDD") 405, fan 406, optical disc drive ("ODD") 407, and sound component 402, among others. It will be readily appreciated that some components can provide load bearing as well as electrical ground bearing capabilities.

As noted above, some of the localized separate grounding components and/or the electrical couplers therebetween can provide additional functions for the portable computing device, such that space constraints are minimized, excess metal is not applied solely for the sake of providing a ground plane, and overall device components are reduced and streamlined. For example, backplate 410 is a localized separate ground component that forms part of universal grounding structure 400, and can also serve as an inner structural component to which outer housing 201 can attach and be supported. As noted previously, outer housing 201 can comprise any of a wide variety of non-conducting materials having any of a wide variety of appearances and textures under the present invention, such as a thermoplastic, for example. As such, backplate 410 can provide structural support and rigidity for a potentially structurally unreliable outer housing 201. Thus, backplate 410 may serve as the structural support layer noted in the "Outer Housing" section above. To meet all of the foregoing functional requirements, backplate 410 can be comprised of a suitable metal, such as aluminum, steel, magnesium or a magnesium alloy, for example.

MLB frame 420 provides another example of a localized separate ground component that provides multiple functions for portable computing device 200. That is, in addition to providing a localized separate ground component for electrical items such as MLB 403, fan 406, and numerous electrical components on or coupled to MLB 403, MLB frame 420 also provides support and structural rigidity for MLB 403. Due to the potentially large number of individual components on MLB 403 that are surface mounted or are otherwise susceptible to being damaged by flexion, MLB 403 must be firmly supported. MLB frame can be specifically designed to perform such a support function. Other components that can be mounted to and physically supported by MLB frame 420 can include fan 406, optical disc drive 407, and sound component 402, among others. As noted above, sound component 402 can comprise an integrated audio/wireless card that is electrically connected to MLB 403 and also to MLB frame 420 by way of a flex or ribbon line connector 424. Such a connection to MLB frame 420 can be made at a grounding point 425 where a midsection of flex or ribbon line connector 424 contacts a wall edge of the MLB frame, for example. Additional components that MLB 420 may provide grounding for include any number of I/O ports that may be coupled to MLB 403.

As yet another function, MLB frame 420 can also provide RF or EMI shielding for MLB 403. Such an RF or EMI shield can effectively result from a combination of MLB frame 420 and backplate 410, since MLB frame 420 may not surround MLB 403 in all directions. In some embodiments, MLB frame 420 and backplate 410 may combine to serve as a localized Faraday cage for MLB 403, although the MLB frame and backplate combination preferably at least provides an EMI shield to insulate any noise between the MLB and one or more other components located elsewhere on portable computing device 200. In particular, the RF shielding aspects of MLB frame 420 and/or backplate 410 can shield noise or interference between the MLB 403 and any wireless antennae in the portable computing device 200, such as antennae that may be embedded in the display housing and/or display clutch assembly, for example. Electrical connectors between MLB frame 420 and backplate 410, such as grounding pins 415, may further enhance the combined universal ground plane and/or EMI shielding properties of these components.

MLB frame 420 can be formed from a strong, rigid, lightweight, and electrically conductive material, such as aluminum, magnesium or a magnesium alloy, among other suitable choices. In some embodiments, a magnesium alloy is used. As noted, MLB frame 420 can provide structural support and rigidity for various components that do not tolerate much flexion, such as MLB 403. MLB frame 420 can also distribute loads received from one or more load bearing components, such as by way of various structural connectors. In some embodiments, MLB frame 420 can be configured to provide support to external features fabricated in the non-conducting outer housing. For example, various openings in the outer housing can be used to provide access to data ports, power ports and so on, some of which may be required to have relatively large spans.

In some embodiments, MLB frame 420 can form five sides of a rectangular box, with the MLB 403 being disposed therein, and the open sixth side being covered by backplate 410 after assembly. In some embodiments, MLB frame 420 can be sized such that it is only slightly larger than the MLB 403, such that excess material is not wasted. This can result in savings on the cost and weight of MLB frame 420, and portable computing device 200 overall. In some embodiments, MLB frame 420 may be integrally formed with one or more extensions that are used to provide structural support and/or electrical grounding for one or more other electrical components within portable computing device 200. For example, a lateral extension of MLB frame 420 can extend from MLB 403 across and above ODD 407 and to the opposing sidewall of the outer housing of body 202. Such a lateral extension may also include holes, and a middle wall may exist within MLB frame 420 between the MLB 403 and the ODD 407, such as for added separation and support.

The weight of preferably lightweight MLB frame 420 can be further reduced by forming a plurality of holes 422 therethrough by using any of a number of suitable techniques, such as stamping. The plurality of holes 422 can reduce the weight of MLB frame 420 without substantially affecting its strength or its ability to provide support for components that have little or no tolerance for flex, such as MLB 403. In addition, the plurality of holes 422 can be arranged in a particular pattern such that EMI shielding is maximized despite the removal of a significant amount of material from MLB frame 420. Such hole creation or material removal patterns that results in a reliable EMI shield will be readily appreciated by those skilled in the art, and any such suitable pattern may be used for the holes 422 on MLB frame 420.

As noted above, a variety of electrical connectors can be used to couple electrically separate ground components, such as backplate 410 and MLB frame 420. For example, MLB 403 and or a plurality of grounding pins 415 can be utilized to electrically intercouple backplate 410 and MLB frame 420. Of course, other electrical connectors can be used for the same purpose, and alternative indirect paths may also result in an electrical coupling of backplate 410 and MLB frame 420 as part of the general formation of a universal grounding structure 400. Further electrical connectors can be used to connect backplate 410 and/or MLB frame 420 to one or more other localized separate ground components, such a rear bracket 430 and/or display chassis 440. For example, a plurality of rear bracket tabs 435 can electrically couple rear bracket 430 to MLB frame 420, while display chassis wiring 445 can couple display chassis 440 to rear bracket 430, such as via a display clutch assembly 450. In addition, a ribbon line connector 424 coupled to a sound component 402 that is in turn coupled to the display clutch assembly 450 can electrically connect the MLB frame 420 to the display chassis wiring 445 and thus the display chassis 440.

In some embodiments, the integrated wireless/audio card comprising sound component 402 might not be mounted directly to MLB frame 420, but rather can rest on a metal platform or wing that is part of ODD 407, which can be used to accommodate optical media, for example. In addition to providing support, the metal platform can provide a chassis ground to which display chassis wiring 445 can be connected. As noted previously, grounding pins 415 can be used to make electrical contact between MLB frame 420 and backplate 410, such as through MLB 403. Grounding pins 415 may serve as direct contacts between MLB frame 420 and backplate 410 that are electrically isolated from the MLB 403 itself. Alternatively, one or more grounding pins 415 can make one or more direct contacts to various grounded regions on MLB 403. Grounding pins 415 can be, for example, pogo pins, although other suitable grounding pin types may be used.

In this way, MLB frame 420, backplate 410 and grounding pins 415 can combine to form an effective EMI or RF shield that can contain RF energy generated by various components on MLB 403. Moreover, the RF shield can also protect circuits such as the integrated wireless/audio card or other sound component 402 from RF leakage and interference that can seriously impact the wireless performance of such an integrated wireless/audio card.

Figure 9:
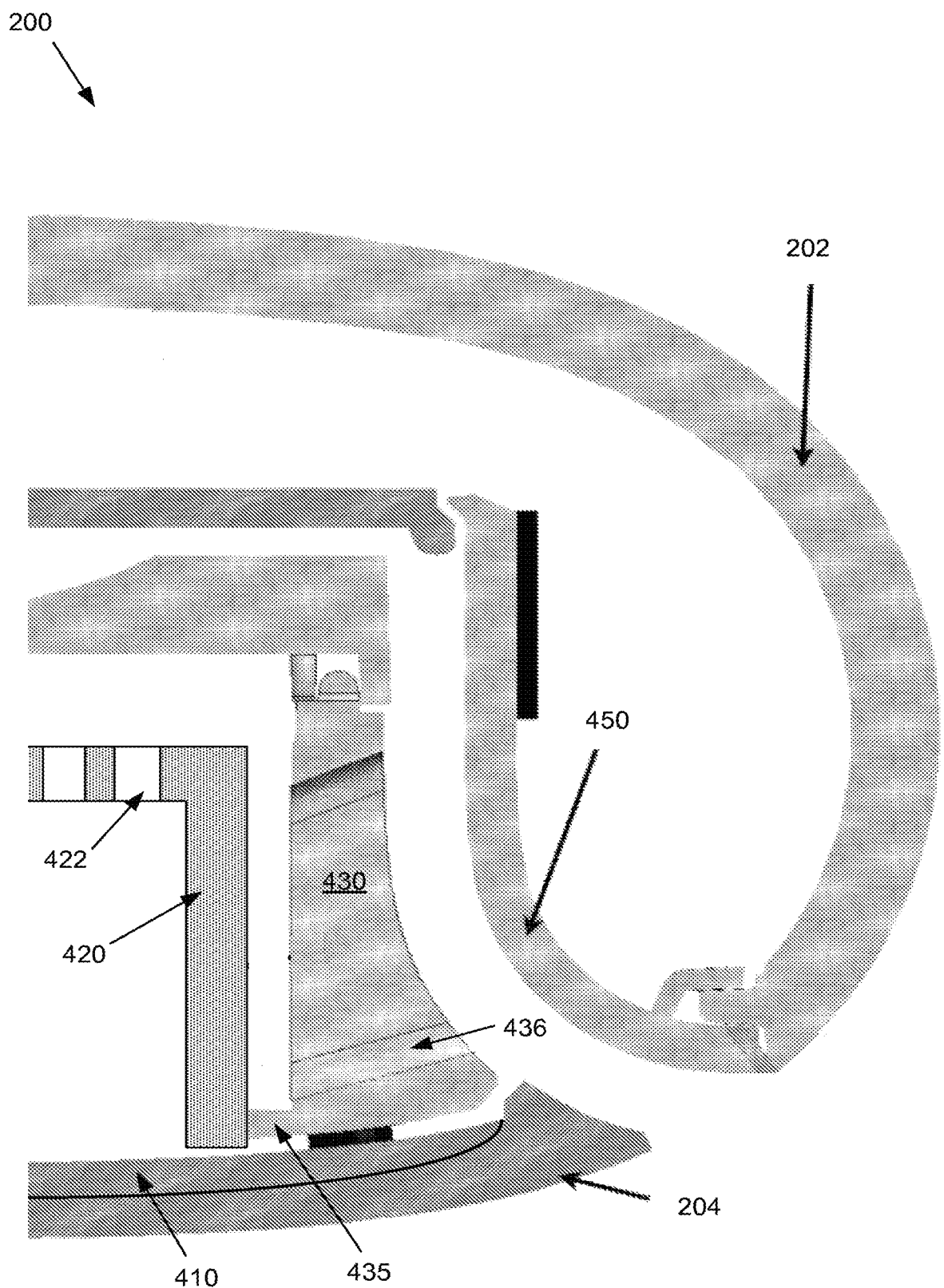
FIG. 9 illustrates in close-up side cross-sectional view the rear bracket and surrounding region for the exemplary portable computing device of FIG. 7 according to one embodiment of the present invention.

Turning next to FIG. 9, the rear bracket and its surrounding region is shown in close-up side cross-sectional view for purposed of clarity. As yet another example of a multifunctional separate ground component, rear bracket 430 can provide localized grounding for one or more associated electrical components, as well as providing overall structural support at various locations and assistance in the mechanical interaction between body 202 and lid 204 of portable computing device 200. In various embodiments, rear bracket 430 can act as a cantilever beam with respect to body 202 and lid 204. Accordingly, rear bracket 430 can be formed of a strong, lightweight, and resilient material, such as a magnesium or magnesium alloy. In addition, rear bracket 430 can aid in the distribution of high concentration loads that if applied to MLB frame 420 without dissipation could adversely affect the bond between MLB frame 420 and the outer enclosure.

Furthermore, rear bracket 430 can be formed to include vent like structures 436 that can facilitate the transfer of air between the outer housing of the portable computing device and the external environment, while at the same time obscuring an interior view of the portable computing device from the outside. Rear bracket 430 can also be adapted to transfer mechanical loads from lid 204 to body 206 by way of a display clutch 450 to MLB frame 420 and/or backplate 410. While rear bracket 430 can form a localized separate ground structure, this rear bracket can also have a plurality of rear bracket tabs 435 that directly contact MLB frame 420, such that these two separate ground structures are directly electrically connected as part of the universal grounding structure of portable computing device 200. Rear bracket tabs 435 can be integrally formed as a part of rear bracket 430, and can be, for example, beveled contact points that are specifically machined into the rear bracket 430 during its manufacture.

Display chassis 440 may also serve as a localized separate ground component. Unlike separate ground components 410, 420 and 430, display chassis is located in the lid 204 rather than the body 202 of portable computing device 200. FIG. 10A illustrates in front elevation view the lid 204 of the exemplary portable computing device of FIG. 7, while FIG. 10B illustrates the lid in side cross-sectional view. Lid 204 of the subject portable computing device can include a display screen 206, a display cover 207, and a surrounding bezel 209, as well as a display chassis 440 and display clutch assembly 450. Display chassis 440 can essentially comprise a metal or otherwise electrically conducting plate or thin component that is sandwiched between the back of display screen 206 and the outer housing of the device. In some embodiments, display chassis 440 can form a frame situated behind and/or at or about the outer edges of display screen 206, with the frame having a missing center portion. Display chassis 440 essentially serves as a localized ground for the display, any antenna, and any other electrical components that may be included within lid 204.

For example, a driver or other printed circuit board (not shown) associated with display screen 206 can be located at or near a bottom portion of lid 204 when the lid is in an upright position, with such an electrical component being coupled to display chassis 440 at that location. Power, ground and other potential electrical wires may run from lid 204 to body 202, such as at or near clutch connectors 452. Such wiring can include display chassis wiring 445, which serves to connect display chassis 440 with one or more contact points on rear bracket 430. One or more display clutch assembly brackets or connectors may serve as intermediaries between display chassis wiring 445 and the contact points on rear bracket 430. Of course, each of these components, including any intermediaries, are all electrically conducting, and any such components in the electrical path wind up being part of the ground plane or universal grounding structure 400 of the device.

As in the case of various forgoing separate localized ground components and connectors in body 202, various parts of the electrical grounding structure found in lid 204 can also provide additional functionalities. For example, display clutch assembly 450 can include clutch connectors 452 that mechanically connect to and transmit loads to MLB frame 420 and/or rear bracket 430 at suitable connector points. Display clutch assembly 450 can be housed within display clutch barrel 454 having back portion 456 that can be part of lid 204. Back portion 456 can be joined to display clutch cover 458 resulting in display clutch seam 459. In the described embodiment, display clutch seam 459 cannot be seen from the back by a user when portable computing device 200, and in particular, top cover 204 is in the closed position. Furthermore, when top cover 204 is in the open position, clutch barrel seam 459 aligns with an associated TPU seam (not shown) giving the impression of continuity even in those areas not expected to be seen in normal operational use.

Figure 10C:
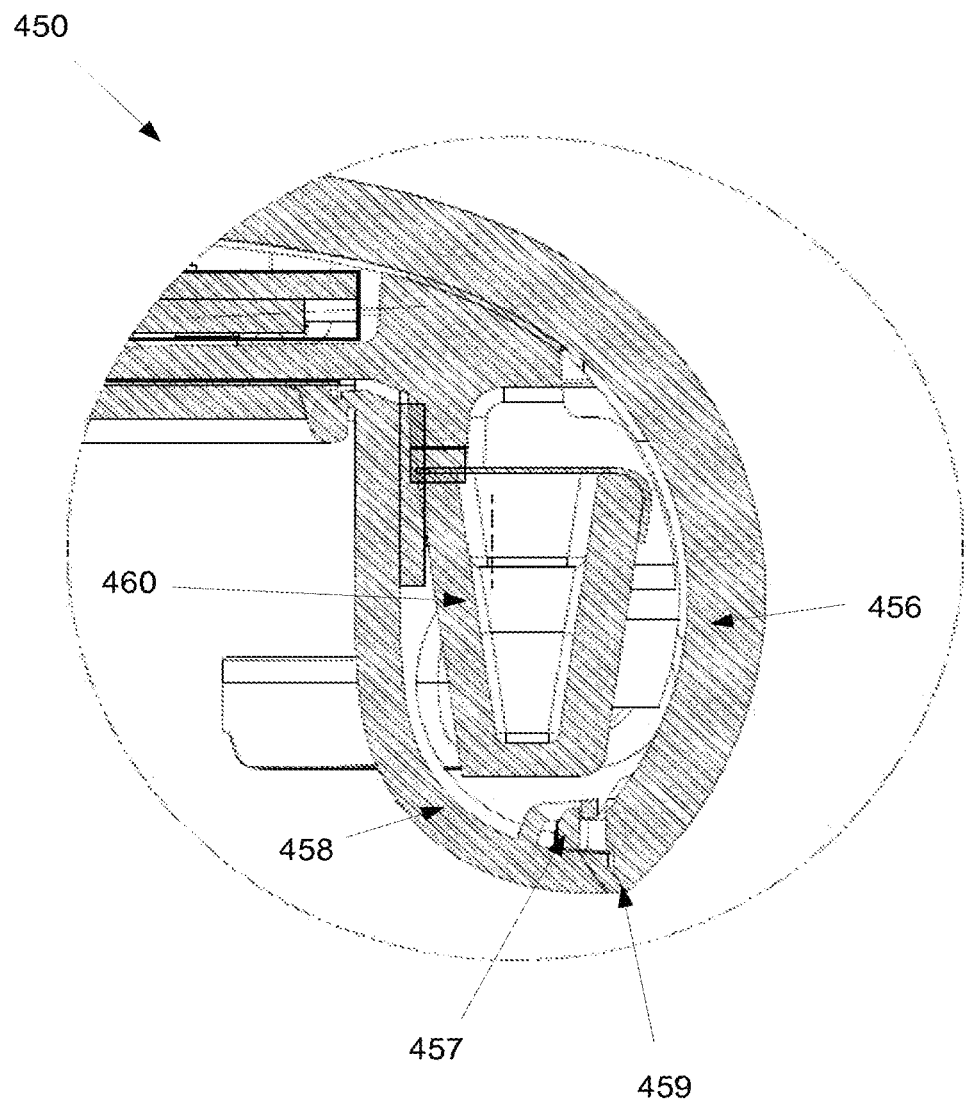
FIG. 10C illustrates in close-up side cross-sectional view the display clutch assembly for the exemplary portable computing device of FIG. 7 according to one embodiment of the present invention.

As shown in greater cross-sectional detail in FIG. 10C, display clutch assembly 450 can enclose and therefore hide from view a number of electrical and mechanical components. For example, display clutch assembly 450 can enclose RF antenna 460, as well as various mechanical items, such as structural and snap connector items. RF antenna 460 can be electrically coupled to display chassis 460, as well as to display chassis wiring 445 that connects the localized separate ground structures found in lid 204 and body 202. The location of display clutch barrel seam 459 can provide for a longer uninterrupted span for top cover 204. Back portion 456 can include a number of snap connectors 457 that are used to secure the display clutch cover 458 to the back portion 456.

Although the foregoing invention has been described in detail by way of illustration and example for purposes of clarity and understanding, it will be recognized that the above describe d invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A portable computing device, comprising:
   an outer housing configured to enclose and support a plurality of internal components, the outer housing being composed predominantly of one or more electrically non-conducting materials;
   a main logic board located within the outer housing, the main logic board having a primary processing unit coupled thereto;
   one or more additional electrically powered components located within the outer housing and separate from the main logic board; and
   a grounding structure electrically coupled to each of the main logic board and the one or more additional electrically powered components, wherein the grounding structure includes a plurality of separate ground components that are electrically intercoupled including a rear bracket coupling a top cover of the portable computing device to a lower body of the portable computing device and transmitting physical loads there between, wherein each of the separate ground components is substantially smaller than the overall portable computing device, and wherein at least one of the separate ground components also provides an electromagnetic interference shield around the main logic board.

2. The portable computing device as recited in claim 1, wherein the plurality of separate ground components includes a metal backplate positioned such that the main logic board is between the metal backplate and the electromagnetic interference shield.

3. The portable computing device as recited in claim 2, wherein the metal backplate is electrically and mechanically coupled to the electromagnetic interference shield via a plurality of conductive pins extending through the main logic board.

4. The portable computing device as recited in claim 1, wherein the portable computing device is a laptop computer.

5. The portable computing device as recited in claim 4, wherein the outer housing is composed predominantly of a thermoplastic material.

6. The portable computing device as recited in claim 1, wherein the electromagnetic interference shield comprises a metal Faraday cage of a size that is slightly larger than the main logic board.

7. A portable computing device, comprising:
a keyboard;
a display;
an outer housing including a body that houses the keyboard and a lid that houses the display, the body composed of predominantly one or more electrically non-conducting thermoplastic materials and configured to enclose and support a plurality of internal components;
electrically powered components located within the outer housing; and
a grounding structure electrically coupled to each of the electrically powered components, the grounding structure comprising a plurality of separate ground components that are electrically intercoupled including a back plate positioned within the body that provides support and rigidity to the body, a frame positioned within the lid adjacent to the display and a rear bracket within the lid that transmits physical loads between the body and the lid, each of the separate ground components being substantially smaller than the overall portable computing device.

8. The portable computing device as recited in claim 7, wherein the plurality of separate ground components comprises an electromagnetic interference shield.

9. The portable computing device as recited in claim 8, wherein the electrically powered components comprise a main logic board at least partially surrounded by the electromagnetic interference shield.

10. The portable computing device as recited in claim 9, wherein the plurality of separate ground components includes a metal backplate positioned such that the main logic board is between the metal backplate and the electromagnetic interference shield.

11. The portable computing device as recited in claim 7, wherein the portable computing device is a laptop.

12. The portable computing device as recited in claim 7 further comprising a main logic board positioned within the body and, wherein the separate ground components further include a frame that supports the main logic board.

13. The portable computing device as recited in claim 7, wherein the rear bracket includes a plurality of vents formed there through that facilitate transfer of air between the outer housing and the environment external the portable computing device.

14. The portable computing device as recited in claim 7, wherein the electrically powered components comprise a main logic board and the plurality of separate ground components comprise a main logic board frame and a backplate, the main logic board frame and the backplate cooperatively shield the main logic board from electromagnetic radiation.

15. A portable computing device, comprising:
a device housing;
an electronic display screen carried by the device housing;
one or more additional electrically powered components located within the device housing and separate from the electronic display; and
a grounding structure electrically coupled to the electronic display and each of the additional electrically powered components, the grounding structure comprising a plurality of separate ground components that are electrically intercoupled including a rear bracket coupling a top cover of the portable computing device to a lower body of the portable computing device and transmitting physical loads there between, each of the separate ground components being substantially smaller than the overall portable computing device.

16. The portable computing device as recited in claim 15, wherein the electrically powered components comprise a main logic board and wherein the plurality of separate ground components includes a metal backplate positioned such that the main logic board is between the metal backplate and a separate electromagnetic interference shield.

17. The portable computing device as recited in claim 16, wherein the metal backplate is electrically and mechanically coupled to the electromagnetic interference shield via a plurality of conductive pins extending through the main logic board.

18. The portable computing device as recited in claim 15, wherein the device housing is formed from predominantly from one or more electrically non-conducting materials.

* * * * *